(12) United States Patent
Katano et al.

(10) Patent No.: US 9,541,980 B2
(45) Date of Patent: Jan. 10, 2017

(54) OPERATION MANAGEMENT DEVICE, OPERATION MANAGEMENT METHOD, AND RECORDING MEDIUM

(71) Applicant: FUJITSU LIMITED, Kawasaki-shi, Kanagawa (JP)

(72) Inventors: Satsuki Katano, Kawasaki (JP); Naohiro Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 224 days.

(21) Appl. No.: 14/477,958

(22) Filed: Sep. 5, 2014

(65) Prior Publication Data
US 2014/0380079 A1  Dec. 25, 2014

Related U.S. Application Data

(63) Continuation of application No. PCT/JP2012/056827, filed on Mar. 16, 2012.

(51) Int. Cl.
*G06F 1/30* (2006.01)
*G06F 11/14* (2006.01)
(Continued)

(52) U.S. Cl.
CPC .............. *G06F 1/30* (2013.01); *G06F 11/1441* (2013.01); *G06F 11/3058* (2013.01);
(Continued)

(58) Field of Classification Search
None
See application file for complete search history.

(56) References Cited

U.S. PATENT DOCUMENTS 5,117,324 A * 5/1992 Johnson, Jr. .............. G06F 1/30
307/66
6,304,981 B1 * 10/2001 Spears .................. G06F 11/004
714/22

(Continued)

FOREIGN PATENT DOCUMENTS

JP        63-67617         3/1988
JP        6-113483         4/1994
(Continued)

OTHER PUBLICATIONS

Espacenet English Abstract of Japanese Publication No. 63-67617, Published Mar. 26, 1988.
(Continued)

*Primary Examiner* — Paul Yanchus, III
(74) *Attorney, Agent, or Firm* — Staas & Halsey LLP

(57) ABSTRACT

An operation management device that comprises: a memory configured to store, for a plurality of nodes that each operate on one computer out of a plurality of computers included in a computer system and for a plurality of nodes capable of moving between the plurality of computers, operation suspension sequence data of the plurality of nodes, and data of operation suspension times needed for operation suspension of each of the plurality of nodes; and a processor configured to execute a procedure, the procedure comprising: from a timing earlier than suspending operation of the computer system and a timing earlier than a total sum of the operation suspension times of the plurality of nodes or greater, suspending operation of the plurality of nodes in an operation suspension sequence indicated by the operation suspension sequence data.

19 Claims, 10 Drawing Sheets

(51) Int. Cl.
  *G06F 11/30* (2006.01)
  *G06F 11/20* (2006.01)
(52) U.S. Cl.
  CPC ...... *G06F 11/2015* (2013.01); *G06F 11/3003* (2013.01); *G06F 11/3055* (2013.01); *G06F 2201/815* (2013.01)

(56) References Cited

U.S. PATENT DOCUMENTS

| | | | |
|---|---|---|---|
| 2005/0278700 A1* | 12/2005 | Buskens | G06F 9/485 717/120 |
| 2007/0210650 A1 | 9/2007 | Togashi | |
| 2009/0249354 A1 | 10/2009 | Yamaguchi et al. | |

FOREIGN PATENT DOCUMENTS

| | | |
|---|---|---|
| JP | 7-160370 | 6/1995 |
| JP | 11-155243 | 6/1999 |
| JP | 2002-108515 | 4/2002 |
| JP | 2005-4381 | 1/2005 |
| JP | 2007-179252 | 7/2007 |
| JP | 2007-241827 | 9/2007 |
| JP | 2009-245316 | 10/2009 |
| JP | 2009-282714 | 12/2009 |
| JP | 2012-38157 | 2/2012 |

OTHER PUBLICATIONS

Japanese Office Action dated Jun. 9, 2015 in corresponding Japanese Patent Application No. 2014-504584.
Patent Abstracts of Japan, Publication No. 06-113483, published Apr. 22, 1994.
Patent Abstracts of Japan, Publication No. 07-160370, published Jun. 23, 1995.
Patent Abstracts of Japan, Publication No. 11-155243, published Jun. 8, 1999.
Patent Abstracts of Japan, Publication No. 2002-108515, published Apr. 12, 2002.
Patent Abstracts of Japan, Publication No. 2005-004381, published Jan. 6, 2005.
Patent Abstracts of Japan, Publication No. 2007-179252, published Jul. 12, 2007.
Patent Abstracts of Japan, Publication No. 2007-241827, published Sep. 20, 2007.
Patent Abstracts of Japan, Publication No. 2009-245316, published Oct. 22, 2009.
Patent Abstracts of Japan, Publication No. 2009-282714, published Dec. 3, 2009.
Patent Abstracts of Japan, Publication No. 2012-038157, published Feb. 23, 2012.
International Search Report mailed May 29, 2012, in corresponding International Patent Application No. PCT/JP2012/056827.

* cited by examiner

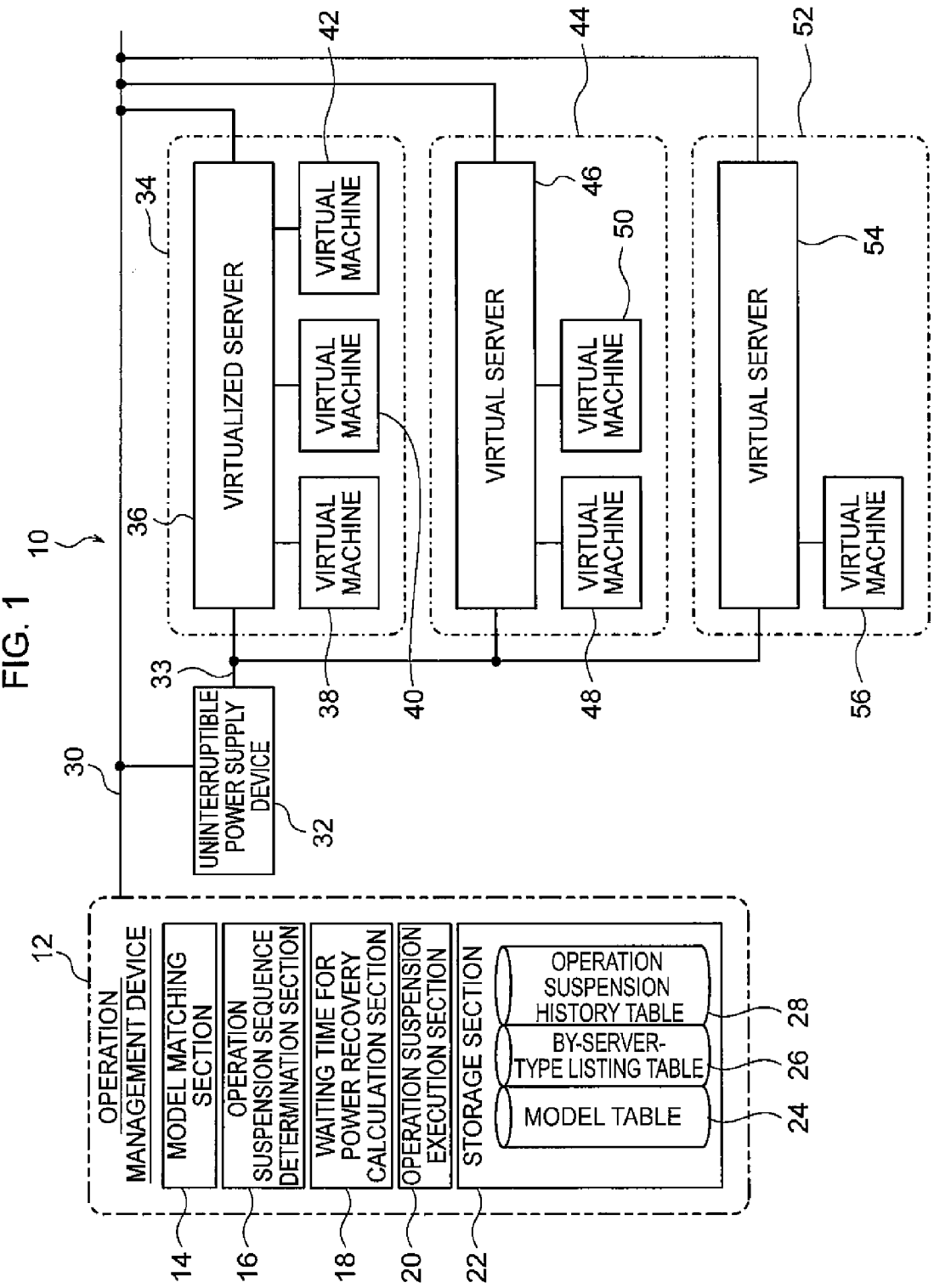

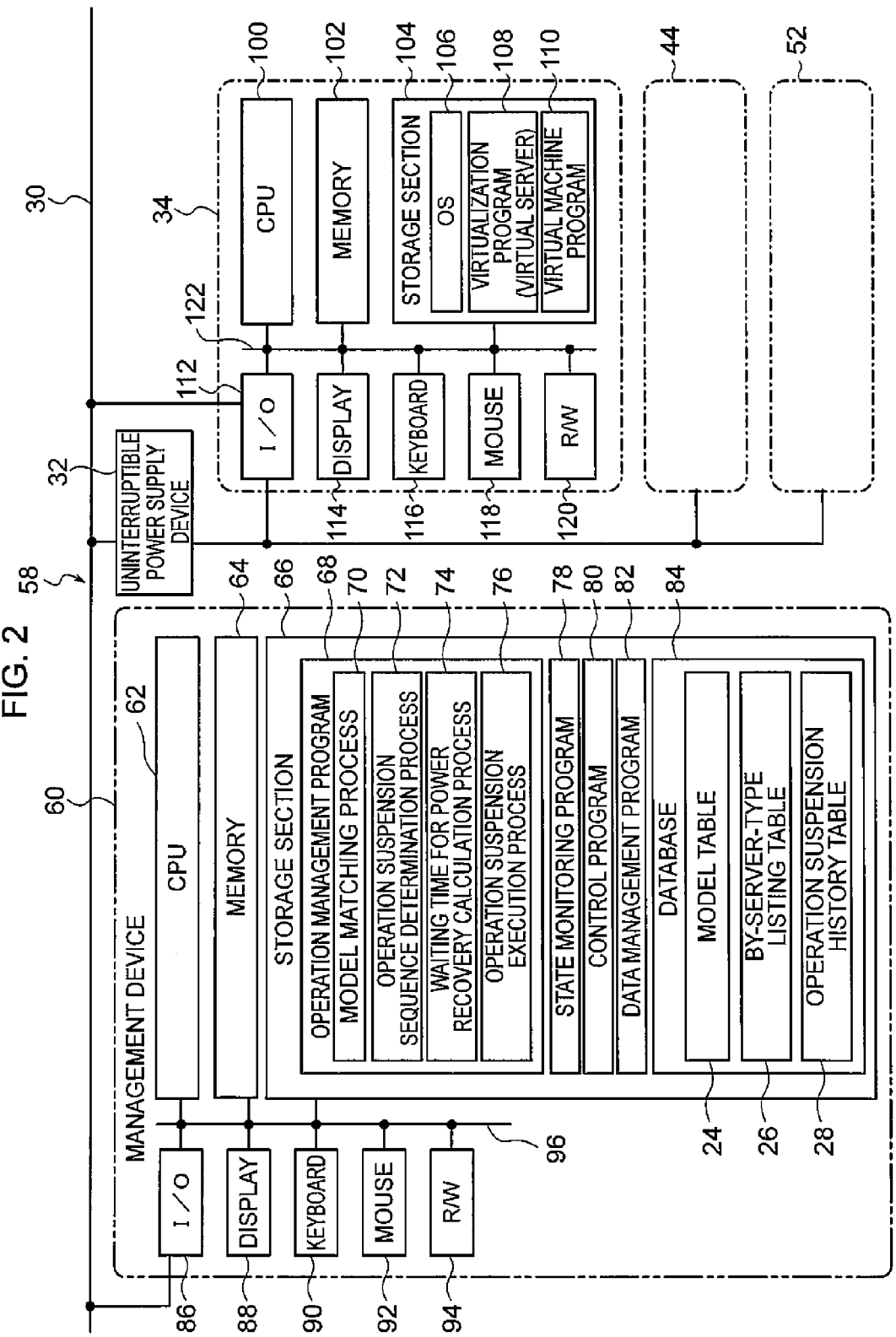

FIG. 3

| MODEL NAME | OPERATION SUSPENSION SEQUENCE | BUFFER TIME (INITIAL VALUE) | OPERATION SUSPENSION TIME (INITIAL VALUE) |
|---|---|---|---|
| Model-1 | ["WEB_Server","AP_Server","DB_Server"] | [ 30,30,60 ] | [ 300,300,480 ] |
| Model-2 | ["Client","Server"] | [ 10,10 ] | [ 300,300 ] |
| ⋮ | ⋮ | ⋮ | ⋮ |

FIG. 4

| uuid | SERVER TYPE | DEPENDENCY DESTINATION (uuid) | WAITING TIME FOR POWER RECOVERY | OPERATION SUSPENSION TIME | BUFFER TIME | OPERATION SUSPENSION NOT-POSSIBLE FLAG | OPERATION SUSPENSION SEQUENCE POSITION |
|---|---|---|---|---|---|---|---|
| uuid-1 | WEB_Server |  | 1028 | 300 | 30 | false | 1 |
| uuid-2 | AP_Server | uuid-1 | 1358 | 412 | 30 | false | 2 |
| uuid-3 | DB_Server | uuid-2 |  | 970 | 60 | true | 3 |
| ⋮ | ⋮ | ⋮ | ⋮ | ⋮ | ⋮ | ⋮ | ⋮ |

FIG. 5

| uuid | OPERATION SUSPENSION TIME |
|---|---|
| uuid-1 | [] |
| uuid-2 | [400,420,430,410,400] |
| uuid-3 | [960,900,990,1000,980,990] |
| ⋮ | ⋮ |

OPERATION MANAGEMENT DEVICE, OPERATION MANAGEMENT METHOD, AND RECORDING MEDIUM

CROSS-REFERENCE TO RELATED APPLICATION

This application is a continuation application of International Application No. PCT/JP2012/056827, filed Mar. 16, 2012, the disclosure of which is incorporated herein by reference in its entirely.

FIELD

The embodiments discussed herein are related to an operation management device, an operation management method, and a recording medium.

BACKGROUND

A computer, such as a server employed in operations, is generally connected to an uninterruptible power supply device that continuously supplies power when power supply has been interrupted in an emergency, such as a power outage. Data processing systems are also known that operate with plural computers having an interdependence relationship related to operation suspension that are connected to an uninterruptible power supply device. For example, in a data processing system operating with plural computers, a monitoring process is executed in each of the computers to monitor the uninterruptible power supply device. As an example of a monitoring process, when an interrupted state of power supply to the uninterruptible power supply device is detected in an emergency, such as a power outage, operation suspension processing of the computer is executed, and operation of the computer is suspended (so-called shutdown).

As an example of suspending operation of plural computers, technology is known in which a management device monitors an emergency power supply, such as an uninterruptible power supply device, and computers. In such technology, a user manually sets the management device with priorities for executing operation suspension processing of the computers. Technology employed in operation suspension processing of computers is also known in which plural application processes being executed on a single computer connected to the emergency power supply, such as an uninterruptible power supply device, are monitored, and these processes are stored in priority sequence. In such technology, in an emergency, such as a power outage, the execution sequence of programs is controlled such that processing is completed within the power supply time of the emergency power supply.

However, in data processing systems, when suspending the operation of plural computers having an interdependence relationship, a state needs to be avoided in which suspension of operation of the computers is not achieved within the power supply time of the emergency power supply. A fixed waiting time for power recovery is accordingly provided in each of the computers, and operation suspension processing is executed after the fixed waiting time for power recovery has elapsed.

For example, technology used in computer operation suspension processing is known that derives the power supply capacity, and the power supply available time, of an interruptible power supply device. In such technology, the time needed for operation suspension processing of one computer connected to an uninterruptible power supply device is subtracted from the power supply available time of the uninterruptible power supply device, and operation suspension processing is started at this time. Technology is also known for suspending power connection after operation suspension of a computer is completed, in which power connection to a computer is suspended when a communication result from an uninterruptible power supply device for a computer indicates a non-communication state. Technology is also known that sends a computer and peripheral devices connected to an uninterruptible power supply device commands to suspend operations, in sequence from the longest time needed for suspension.

RELATED PATENT DOCUMENTS

Japanese Laid-Open Patent Publication No. 2009-282714
Japanese Laid-Open Patent Publication No. H07-160370
Japanese Laid-Open Patent Publication No. H06-113483
Japanese Laid-Open Patent Publication No. 2005-4381
Japanese Laid-Open Patent Publication No. H11-155243

SUMMARY

According to an aspect of the embodiments, an operation management device comprises: a memory configured to store, for a plurality of nodes that each operate on one computer out of a plurality of computers included in a computer system and for a plurality of nodes capable of moving between the plurality of computers, operation suspension sequence data of the plurality of nodes, and data of operation suspension times needed for operation suspension of each of the plurality of nodes; and a processor configured to execute a procedure. The procedure comprises: from a timing earlier than suspending operation of the computer system and a timing earlier than a total sum of the operation suspension times of the plurality of nodes or greater, suspending operation of the plurality of nodes in an operation suspension sequence indicated by the operation suspension sequence data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram illustrating a schematic configuration of an operation management system according to a present exemplary embodiment;

FIG. 2 is a block diagram illustrating a schematic diagram of a computer system according to the present exemplary embodiment;

FIG. 3 is a diagram illustrating an example of a model table;

FIG. 4 is a diagram illustrating an example of a by-server-type listing table;

FIG. 5 is a diagram illustrating an example of an operation suspension history table;

DESCRIPTION OF EMBODIMENTS

Figure 6:
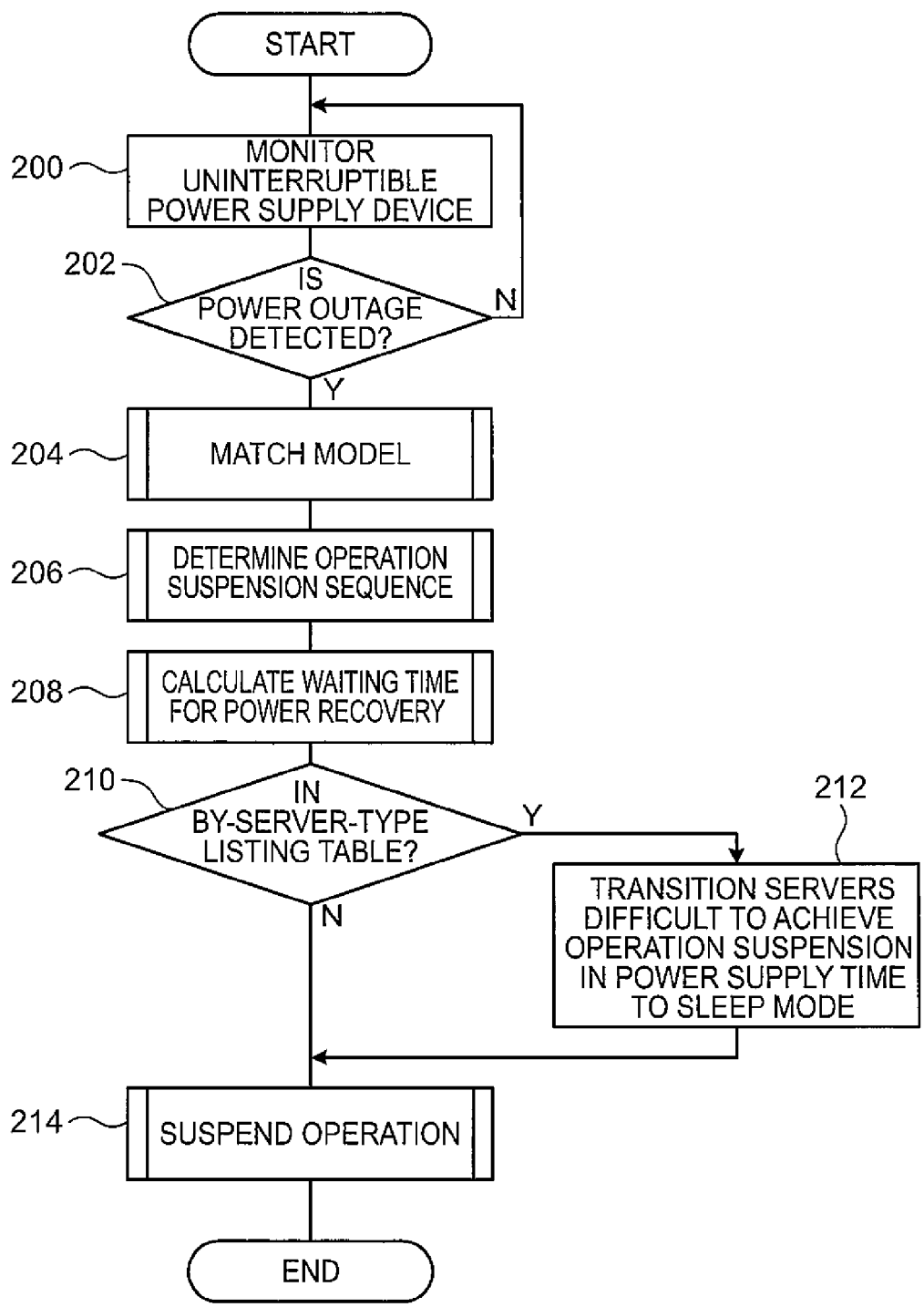
FIG. 6 is a flow chart illustrating the flow of processing of an operation management program.

Detailed explanation follows regarding an example of an exemplary embodiment of technology disclosed herein, with reference to the drawings.

FIG. 1 illustrates a schematic configuration of an operation management system 10 according to the present exemplary embodiment. In the operation management system 10, an operation management device 12, an uninterruptible power supply device 32, and plural computers managed by the operation management device 12 (computers 34, 44, 52 in the present exemplary embodiment), are respectively connected to a network 30, such as a LAN. The network 30 may include a communication network, such as the internet. The uninterruptible power supply device 32 is connected so as to enable data exchange with each of the computers 34, 44, 52 through dedicated lines 33.

In FIG. 1, the three computers 34, 44, 52 are illustrated as an example of plural computers that the operation management device 12 manages; however, there is no limitation to three, and any number of computers that is two or more may be employed.

The operation management device 12 is employed for managing processing for operation suspension (so-called shutdown) for the computers 34, 44, 52 under its management. More detailed explanation is given below, and the operation management device 12 is implemented, for example, by a computer. The operation management device 12 includes a model matching section 14, an operation suspension sequence determination section 16, a waiting time for power recovery calculation section 18, an operation suspension execution section 20, and a storage section 22. The storage section 22 is stored with data of a model table 24, a by-server-type listing table 26, and an operation suspension history table 28.

Note that in the present exemplary embodiment, explanation is given in which the operation management device 12 performs power supply interruption processing for a computer, such as so-called shutdown, as an example of management of operation suspension processing for computers, virtualized servers and virtual machines. However, technology disclosed herein is not limited to power supply interruption processing. For example, another example of management of processing of operation suspension, such as of a computer, includes the operation management device 12 managing system processing such as processing to forcibly close and reboot a system.

Respective virtualized servers and virtual machines, included in computers of the present exemplary embodiment, are examples of nodes of technology disclosed herein.

The uninterruptible power supply device 32 is a device that supplies power for a predetermined fixed time, as a power supply available time, to connected equipment during an emergency, such as power outage. The uninterruptible power supply device 32 exchanges data and commands with the operation management device 12, and also exchanges data and commands with the computers 34, 44, 52.

Although described in detail below, briefly, the computer 34 includes a virtualized server 36, and the three virtual machines 38, 40, 42 obtained by using generally known virtualization as processing capable of configuring plural systems with a single computer. The computer 44 includes a virtualized server 46, and two virtual machines 48, 50. The computer 52 includes a virtualized server 54, and one virtual machine 56.

In the present exemplary embodiment, the operation management system 10 illustrates a configuration example including the operation management device 12, the uninterruptible power supply device 32, and the three computers 34, 44, 52; however, the number of computers included in the operation management system 10 is not limited to three. For example, there may be one computer, or there may be two or more computers. The number of virtual machines included on a computer may be one or more.

In the present exemplary embodiment, an example of a configuration is illustrated with the virtualized servers and virtual machines included on the computers 34, 44, 52; however, there is no limitation to only computers including virtualized servers and virtual machines. For example, a computer contained in the operation management system 10 may be a server configured with a single system.

FIG. 2 illustrates a schematic configuration of a computer system 58 including a management device 60 including the operation management device 12 according to the present exemplary embodiment, and, for example, implemented by a computer.

The operation management device 12 may, for example, be implemented by the function of part of the management device 60 illustrated in FIG. 2. The management device 60 may be implemented by a computer. More specifically, the management device 60 includes a CPU 62, a memory 64, and a non-volatile storage section 66, connected together by a bus 96. The storage section 66 may be implanted by a Hard Disk Drive (HDD), flash memory, or the like. The management device 60 includes an interface (I/O) 86 for connecting to the network 30, and the I/O 86 is connected to the bus 96. The management device 60 includes a display 88, this being a display device as an example of an output device, and a keyboard 90 and a mouse 92, that are input-output equipment and serve as an example of an input-output device, with these being connected to the bus 96. The management device 60 includes a device (R/W) 94 for inserting a recording medium into, and reading and writing to the inserted recording medium, with this connected to the bus 96. The display 88, the keyboard 90, the mouse 92, and the device (R/W) 94 may be omitted, and may be connected to the bus 96 if needed.

The storage section 66 is stored with an operation management program 68 to cause the management device 60 to function as the operation management device 12 so as to execute processing to manage the operation of the computers 34, 44, 52 and, for example, to execute processing suspension of a computer. The CPU 62 reads the operation management program 68 from the storage section 66, expands the operation management program 68 in the memory 64, and sequentially executes the processes of the operation management program 68. Namely, the operation management device 12 is implemented by the management device 60, and the management device 60 operates as the operation management device 12 by the CPU 62 executing the operation management program 68.

The operation management program is an example of an operation management program of technology disclosed herein. The operation management program is a program to cause the management device 60 to function as the operation management device 12.

The operation management program 68 includes a model matching process 70, an operation suspension sequence determination process 72, a waiting time for power recovery calculation process 74, and an operation suspension execution process 76. The CPU 62 operates as the model matching section 14 in the operation management device 12 illustrated in FIG. 1 by executing the model matching process 70. Namely, the operation management device 12 is implemented by the management device 60, and the management device 60 operates as the model matching section 14 in the operation management device 12 by executing the model matching process 70. The CPU 62 operates as the operation suspension sequence determination section 16 in the operation management device 12 illustrated in FIG. 1 by executing the operation suspension sequence determination process 72. Namely, the operation management device 12 is implemented by the management device 60, and the management device 60 operates as the operation suspension sequence determination section 16 in the operation management device 12 by executing the operation suspension sequence determination process 72.

The CPU 62 operates as the waiting time for power recovery calculation section 18 in the operation management device 12 illustrated in FIG. 1 by executing the waiting time for power recovery calculation process 74. Namely, the operation management device 12 is implemented with the management device 60 by a computer, and the management device 60 operates as the waiting time for power recovery calculation section 18 in the operation management device 12 by executing the waiting time for power recovery calculation process 74. The CPU 62 operates as the operation suspension execution section 20 in the operation management device 12 illustrated in FIG. 1 by executing the operation suspension execution process 76. Namely, the operation management device 12 is implemented by the management device 60, and the management device 60 operates as the operation suspension execution section 20 of the operation management device 12 by executing the operation suspension execution process 76.

A state monitoring program 78, a control program 80, and a data management program 82 are stored in the storage section 66 of the management device 60. The state monitoring program 78 is a program to monitor the respective states of the uninterruptible power supply device 32 and the computers 34, 44, 52 managed by the management device 60 in the computer system 58. The control program 80 is a program for operation suspension control of each of the computers 34, 44, 52 based on the processing of the operation management program 68. The control program 80 includes a program to control migration to a virtual machine, described below. The data management program 82 is a program to store history data relating to operation suspension of each of the computers 34, 44, 52. The data management program 82 includes a program to manage models operating on the computer system 58.

A database 84, including the model table 24, the by-server-type listing table 26, and the operation suspension history table 28, is stored in the storage section 66. The database 84 stored in the storage section 66 of the management device 60 corresponds to the storage section 22 of the operation management device 12 illustrated in FIG. 1.

The model table 24 is stored in the database 84 with the name of models of plural computers operating with an interdependence relationship in the computer system 58, and with data relating to the models. In the present exemplary embodiment, the models correspond to network architectures. For example, network architectures such as a 3 layer system (3-tier system), a server-client model (client-server), and a peer-to-peer model (peer-to-peer) correspond to the models. A 3 layer system (3-tier system) is a system configured by dividing a client server system into 3 divided layers: "a presentation layer", "an application layer", and "a data layer". A server-client model (client-server) is a system with divided roles of a computer (server) having a specific role, and a computer operated by a user (client), mutually connected together through a network. The peer-to-peer model (peer-to-peer) is one in which there are not fixed roles, and in which computers participating in a network exchange data with each other, and may adopt both the function of a server and of a client.

The model table 24 stored in the database 84, as illustrated in the example of FIG. 3, is recorded with data for each of "model name", "operation suspension sequence", "buffer time", and "operation suspension time", associated with each other. The data of "model name" in the model table 24 illustrated in FIG. 3 is data indicating the giving names and group name of plural computers operating with an interdependence relationship. The data of "operation suspension sequence" is data indicating the operation suspension sequence for the plural computers operating with an interdependence relationship. FIG. 3 illustrates an example in which data indicating types of computer are arrayed in operation suspension sequence. The data of "buffer time" is data indicating a fixed period of time set after operation suspension for each of the plural computers operating with an interdependence relationship. FIG. 3 illustrates an example of initial values stored as "buffer time". The data of "operation suspension time" is data indicating the time needed for operation suspension for each of the plural computers operating with an interdependence relationship. FIG. 3 illustrates an example of initial values stored as "operation suspension time".

The by-server-type listing table 26 is stored in the database 84 with, for each of the plural computers that operate in the computer system 58, data such as interdependence relationships to other computers, and an identifier to identify itself. An example of a by-server-type listing table 26 stored in the database 84 is illustrated in FIG. 4. The by-server-type listing table 26 is recorded with data for each of "uuid", "server type", "dependency destination", "waiting time for power recovery", "buffer time", "operation suspension not-possible flag", "operation suspension sequence position".

The data of the "uuid" in the by-server-type listing table 26 illustrated in FIG. 4 is data to manage and identify the individual computers. FIG. 4 illustrates an example in which a universally unique identifier (UUID) is employed as an ID capable of uniquely identifying the computer of "server type". The data of "server type" is data indicating the type of the computer for each of the plural computers that operate in the computer system 58. FIG. 4 illustrates an example in which data is employed that indicates the address and name of the service system provided by the computer. The data of "dependency destination" is data indicating another computer that has an interdependence relationship to operation of the computer itself. FIG. 4 illustrates an example in which a UUID is employed as an ID capable of uniquely identifying another computer.

The data of "waiting time for power recovery" is data indicating the time to wait until a computer starts operation suspension processing. The data of "operation suspension time" is data indicating the time a computer requires for operation suspension processing. The data of "buffer time" is data indicating a fixed time needed after operation suspension of a computer. The data of "operation suspension not-possible flag" is data indicating whether or not it is possible for a computer to perform operation suspension within the power supply available time using the uninterruptible power supply device 32. The data of "operation suspension sequence position" is data indicating the operation suspension sequence of a computer.

The operation suspension history table 28 is stored in the database 84 with, for each of the plural computers operating in the computer system 58, data indicating the history of operation suspension time needed for operation suspension of the computers. An example of an operation suspension history table 28 stored in the database 84 is illustrated in FIG. 5. Data for each of "uuid" and "operation suspension time" are recorded, associated with each other, in the operation suspension history table 28. The data of "uuid" in the operation suspension history table 28 is data for managing and identifying computers. FIG. 5 illustrates an example in which a UUID capable of uniquely identifying a computer is employed. The data of "operation suspension time" is data of operation suspension times needed for operation suspension of a computer, stored as historical data. FIG. 5 illustrates an example of operation suspension times needed for operation suspension, arrayed in sequence from the oldest.

As illustrated in FIG. 2, the computer 34 managed by the management device 60 includes a CPU 100, a memory 102, and a non-volatile storage section 104, connected together through a bus 122. The storage section 104 may be implemented by a Hard Disk Drive (HDD), flash memory, or the like. The computer 34 includes an interface (I/O) 112 for connecting to the network 30, and the I/O 112 is connected to the bus 122. The computer 34 also includes a display 114, a keyboard 116, and a mouse 118, with these connected to the bus 122. The computer 34 also includes a device (R/W) 120 for inserting a recording medium into, and reading and writing to the inserted recording medium, with the device (R/W) 120 connected to the bus 122. Note that the display 114, the keyboard 116, the mouse 118, and the device (R/W) 120 may be omitted, and may be connected to the bus 122 if needed.

The storage section 104 of the computer 34 is stored with an Operating System (OS) 106, a virtualization program 108 that virtualizes the computer 34, and a virtual machine program 110 to cause the computer 34 to operate as a virtual machine. The CPU 100 causes the computer 34 to operate as a physical server by reading the OS 106 from the storage section 104, expanding the OS 106 in the memory 102, and executing the OS 106. The CPU 100 also causes the virtualized server 36 to operate on the computer 34 (FIG. 1) by reading the virtualization program 108 from the storage section 104, expanding the virtualization program 108 in the memory 102, and executing the storage section 104. Virtual machines operating on the virtualized server operating on the computer 34 (the virtual machines 38, 40, 42 in FIG. 1) are operated by reading the virtual machine program 110 from the storage section 104, expanding the virtual machine program 110 into the memory 102, and executing the virtual machine program 110. Namely, the virtualized server 36 is a computer that has been virtually generated within the computer 34. A virtual machine is a computer that has been virtually generated within the computer 34 under management of a virtual server.

Note that there are, for example, cases in which the virtualized server 36 is called, for example, a virtual host. A virtual machine is also sometimes called a virtual host and guest OS.

It is generally possible to obtain a physical server by installing an OS with so-called server functionality on a single computer. A physical server is generally configured with a single system that executes a single application program, such as a mail server. Recently, in order to improve the utilization of physical servers, virtual system technology has been implemented to configure plural systems with a single physical server.

In the present exemplary embodiment, explanation next follows regarding an example of a computer on which virtualization is performed to enable configuration of plural systems using a single computer.

In the present exemplary embodiment, configuration is made such that when the computer 34 is functioning as a physical server, a system is configurable that includes a virtual server and virtual machines on the computer 34. Namely, computer 34 operates as a physical server by the CPU 100 reading in the OS 106 from the storage section 104, expanding the OS 106 in the memory 102, and executing the OS 106. Moreover, the computer 34 operates as the virtualized server 36 by the CPU 100 reading in the virtualization program 108 from the storage section 104, expanding the virtualization program 108 in the memory 102, and executing the virtualization program 108. Furthermore, virtual machines (the virtual machines 38, 40, 42 in FIG. 1) managed by the virtualized server 36 are configured by the CPU 100 reading in the virtual machine program 110 from the storage section 104, expanding the virtual machine program 110 in the memory 102, and executing the virtual machine program 110.

Note that the configurations of the computer 44 and the computer 52 are substantially the same as that of the computer 34, and so further detailed explanation thereof is omitted.

FIG. 1 illustrates, as an example of plural computers included in the operation management system 10, a case in which the computer 34 operates as the virtualized server 36, connected to the three virtual machines 38, 40, 42 under management of the virtualized server 36. A case is illustrated in which the computer 44 operates as the virtualized server 46, connected to the two virtual machines 48, 50 under management of the virtualized server 46. A case is illustrated in which the computer 52 operates as the virtualized server 54, connected to the one virtual machine 56 under management of the virtualized server 54. Although in FIG. 1 an example is illustrated in which there are three, two, and one virtual machines under the management of, and connected to, virtualized servers, the technology disclosed herein there is no limitation to three or less virtualized servers, and there may be four or more.

Operation Management Processing

Explanation next follows regarding operation of the present exemplary embodiment. In the present exemplary embodiment, when a power outage occurs, the operation suspension time (shutdown time), and interdependence relationships between each of the servers, is computed according to the operational conditions of each of the servers (the virtualized servers 36, 38, etc.) connected to the uninterruptible power supply device 32. Then, based on the computed operation suspension times, and the interdependence relationships between each of the servers, operation suspension (shutdown) is performed according to operation suspension sequence of the most appropriate model from out of plural predetermined models.

In the present exemplary embodiment, explanation follows regarding an example in which servers are configured and operated on the virtual machine 38 under management of the virtualized server 36, on the virtual machine 48 under management of the virtualized server 46, and on the virtual machine 56 under management of the virtualized server 54, all configured on the computer 34. The virtual machines 38, 48, 56 operate as a system having interdependency. In the present exemplary embodiment, explanation follows regarding for a case in which a 3 layer system (3-tier system) is operated, as an example of a system having interdependency. A 3 layer system (3-tier system) is a system configured by dividing a client server system into 3 divided layers: "a presentation layer", "an application layer", and "a data layer". In the present exemplary embodiment, during configuration of the 3 layer system, a web server (WEB_SERVER) acting as the "presentation layer" is set on the virtual machine 56. An application server (AP_SERVER) acting as the "application layer" is set on the virtual machine 48. A database server (DB_SERVER) acting as the "data layer" is set on the virtual machine 38.

In the present exemplary embodiment, processing is executed in the management device 60 by the state monitoring program 78, the control program 80, and the data management program 82. For example, the CPU 62 of the management device 60 executes state monitoring processing by reading the state monitoring program 78 from the storage section 66, expanding the state monitoring program 78 in the memory 64, and executing the state monitoring program 78. State monitoring processing may, for example, be executed by instruction from a user using the keyboard 90.

In an example of state monitoring processing, respective states are monitored of the uninterruptible power supply device 32, and the computers 34, 44, 52 managed by the management device 60 in the computer system 58. As a specific example of state monitoring processing, as power supply state monitoring processing, processing discriminates states of whether or not power supply is in place from the uninterruptible power supply device 32, based on a power supply availability signal received, or acquired, from the uninterruptible power supply device 32. As another example of state monitoring processing, as state monitoring processing of the uninterruptible power supply device 32, processing confirms a time, such as a power supply available time, or a power supply remaining time, of the uninterruptible power supply device 32, and an operational state, such as which computers are connected to the uninterruptible power supply device 32. As another example of state monitoring processing, as virtualized state monitoring processing, processing confirms states of virtualized servers and virtual machines being operated on the computer system 58. This confirmation processing enables the server type, the name, and identifiers (for example uuid) of virtualized servers and virtual machines being operated on the computer system 58 to be acquired.

The CPU 62 of the management device 60 executes control processing by reading the control program 80 from the storage section 66, expanding the control program 80 in the memory 64, and executing the control program 80. Examples of control processing are power supply control processing for the computers 34, 44, 52 managed by the management device 60 and migration control processing of virtual machines. A specific example of control processing is performing power supply control of the computers 34, 44, 52 connected through the network 30, and of the virtualized servers 34, 46, 54 and the virtual machines 38, 40, 42, 48, 50, 56 contained on the computers 34, 44, 52. More specifically, control is performed to transmit, to a computer, a virtualized server, or a virtual machine, a command of a power supply interruption order, or a transition order to a sleep state. Other examples of control processing include control processing to migrate a virtual machine contained on the computers 34, 44, 52, to being under management of another virtualized server.

The CPU 62 of the management device 60 executes data management processing by reading the data management program 82 from the storage section 66, expanding the data management program 82 in the memory 64, and executing the data management program 82. Examples of data management processing include operation suspension history recording processing (shutdown historical recording processing), and model management processing (such as recording, correcting, or deleting models). Operation suspension history recording processing (shutdown historical recording processing), a specific example of a data management processing, is processing to record history of at least the suspension of operation of virtual machines, in the operation suspension history table 28 stored in the database 84. The model management processing, another example of data management processing, is processing to record, correct, delete, or the like, models of computers having an interdependence relationship, virtualized servers, or virtual machines contained in the computer system 58. In such model management processing, the model table 24 on the database 84 is recorded, corrected, or deleted by data and commands input by a user with the keyboard 90.

In operation management processing by the operation management device 12, for example, processing by a computer is stopped (see FIG. 1) by suspending operation of a computer (virtual machine or virtualized server) in the operation management system 10. For example, in the operation management system 10, if a power supply interrupted state has arisen in an emergency, such as a power outage, the uninterruptible power supply device 32 continues to perform power supply for a fixed period of time. In the present exemplary embodiment, operation suspension is performed for each of plural computers having an interdependence relationship during power supply for a fixed period of time by the uninterruptible power supply device 32, so as to suppress damage caused by the state of a computer when operation suspension is performed on the computers contained in the operation management system 10.

Namely, in the operation management system 10, when the uninterruptible power supply device 32 has detected a power supply interrupted state, such as a power outage, the operation management device 12 identifies a model in the model matching section 14 (see FIG. 1). Namely, the model matching section 14 references the model table 24 and identifies the model applicable to the plural virtual servers and virtual machines that are being operated in the operation management system 10 and have an interdependence relationship. The operation suspension sequence determination section 16 then determines the sequence for operation suspension of the identified models of virtual servers and virtual machines by referencing the by-server-type listing table 26. The waiting time for power recovery calculation section 18 then calculates the time to start operation suspension for each of the identified models of virtual servers and virtual machines, within the power supply available time of the uninterruptible power supply device 32. The operation suspension execution section 20 then executes operation suspension of the plural virtual servers and virtual machines, and then the physical server, according to the times computed by the waiting time for power recovery calculation section 18, and instructs operation suspension (so-called shutdown) of the computer. Namely, the operation suspension execution section 20 executes instructions for operation shutdown (so-called shutdown) of the virtual machines 38, 40, 42, 48, 50, 56, the virtualized servers 36, 46, 54, and then the computers 34, 44, 52.

FIG. 6 is a flow chart illustrating flow of the operation management program 68 executed by the operation management device 12 according to the present exemplary embodiment. The management device 60 operates as the operation management device 12, and executes the operation management processing, by the operation management program 68 being executed in the management device 60 of the computer system 58. As illustrated in FIG. 6, when the operation management program is executed, processing proceeds to step 200 where the operation management device 12 starts monitoring the uninterruptible power supply device 32, and monitoring of the uninterruptible power supply device 32 continues until an emergency state such as a power outage is detected (until an emergency) (affirmative determination at step 202). The state monitoring program 78 is executed here, and power outage or the like is detected when, for example, in a result of power supply state monitoring processing, non-power supply is indicated by a power supply availability signal indicating whether or not there is a state in which power supply is in place from the uninterruptible power supply device 32.

When power outage or the like has been detected, the model matching section 14 of the operation management device 12 executes model matching processing at step 204. In the model matching processing, a processing routine of the model matching process 70 is executed (see FIG. 7), and a model for the plural virtual servers and virtual machines in operation having an interdependence relationship is identified.

Figure 7:
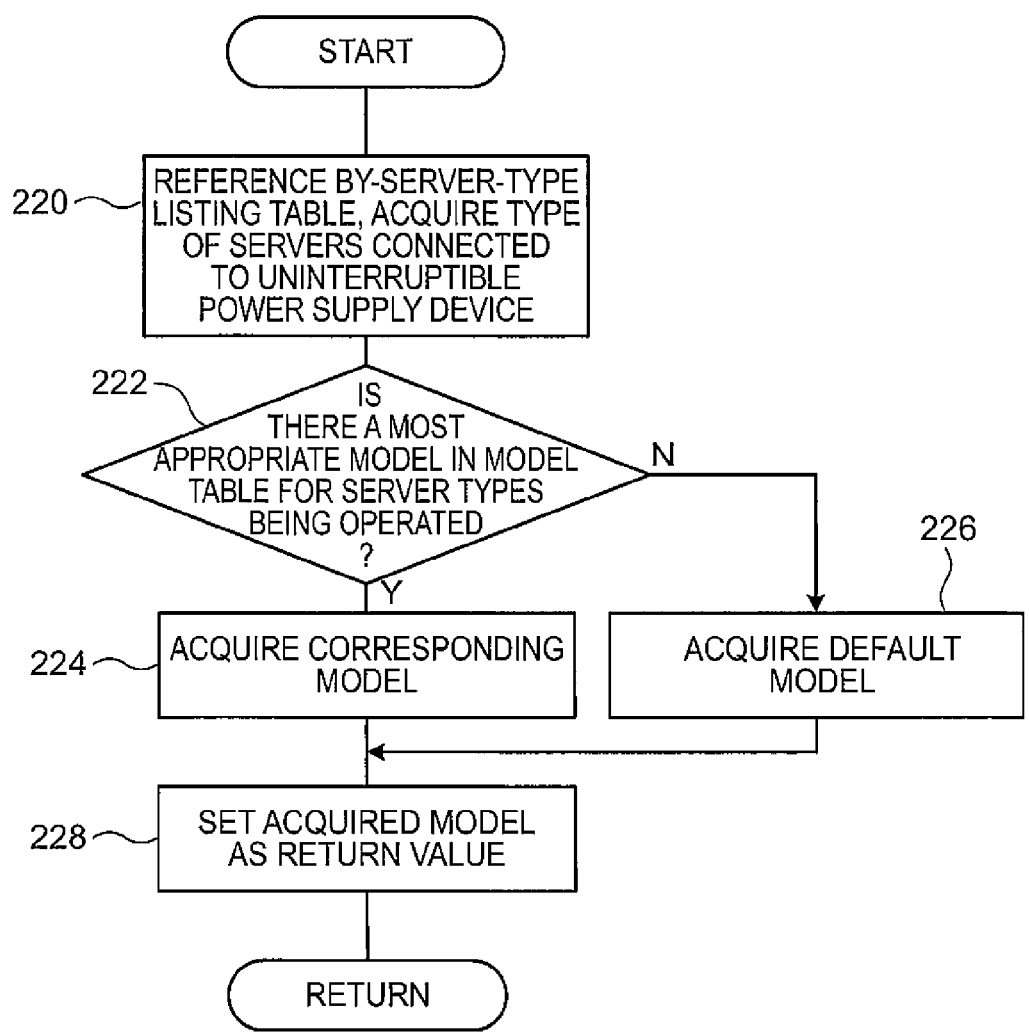
FIG. 7 is a flow chart illustrating a flow of model matching processing.

FIG. 7 is a flow chart illustrating a flow of model matching processing according to the present exemplary embodiment. When the model matching processing is executed, the by-server-type listing table 26 is referenced at step 220, and the types of the servers connected to the uninterruptible power supply device 32 acquired. In this case the web server (WEB_SERVER) of the virtual machine 56, the application server (AP_SERVER), and the database server (DB_SERVER) of the virtual machine 38 are acquired.

Then at step 222, the model table 24 is referenced, and determination is made as to whether or not most appropriate model to the server type in operation is present in the model table 24. The most appropriate model is a network architecture with a degree of match of a threshold value or greater between a combination of sever types in the entries of the model table 24, and the combination of server types in operation. Namely, there is the highest degree of matching when the combination of server types in operation matches the combination of server types in an entry of the model table 24. However, the degree of matching is lower as the number of the server types in the combination of server types in operation that match the server types in the combination of server types in an entry of the model table becomes smaller. In the example in FIG. 3, combinations of server types in the entries of the model table 24 are the server type combinations included in the operation suspension sequence entries.

If affirmative determination is made at step 222, then the model is acquired at step 224, and the model acquired at step 224 is then set as a return value at the next step 228, and the present routine is ended. However, if negative determination is made at step 222, then a model set as an initial value (default model) is acquired at step 226, and, at the next step 228, the default model acquired at step 226 is set as the return value, and the present routine is ended. In the present exemplary embodiment, the 3 layer system (3-tier system) is operating, and so in the operation suspension sequence column of the model table 24, the recorded server types (WEB_SERVER, AP_SERVER, DB_SERVER) match, and the model with model name Model-1 is acquired as the model, and set as the return value.

An example of the model (default model) set as the initial value is a server-client model. Virtual machines of computers in a client server model operate as a computer that is either a server or (server device) or a client (client terminal).

The operation suspension sequence determination section 16 (see FIG. 1) then, at step 206 of FIG. 6, determines the sequence for operation suspension for the virtual servers and virtual machines of the identified model. The processing routine of the operation suspension sequence determination process 72 (see FIG. 8) is executed in the operation suspension sequence determination processing.

Figure 8:
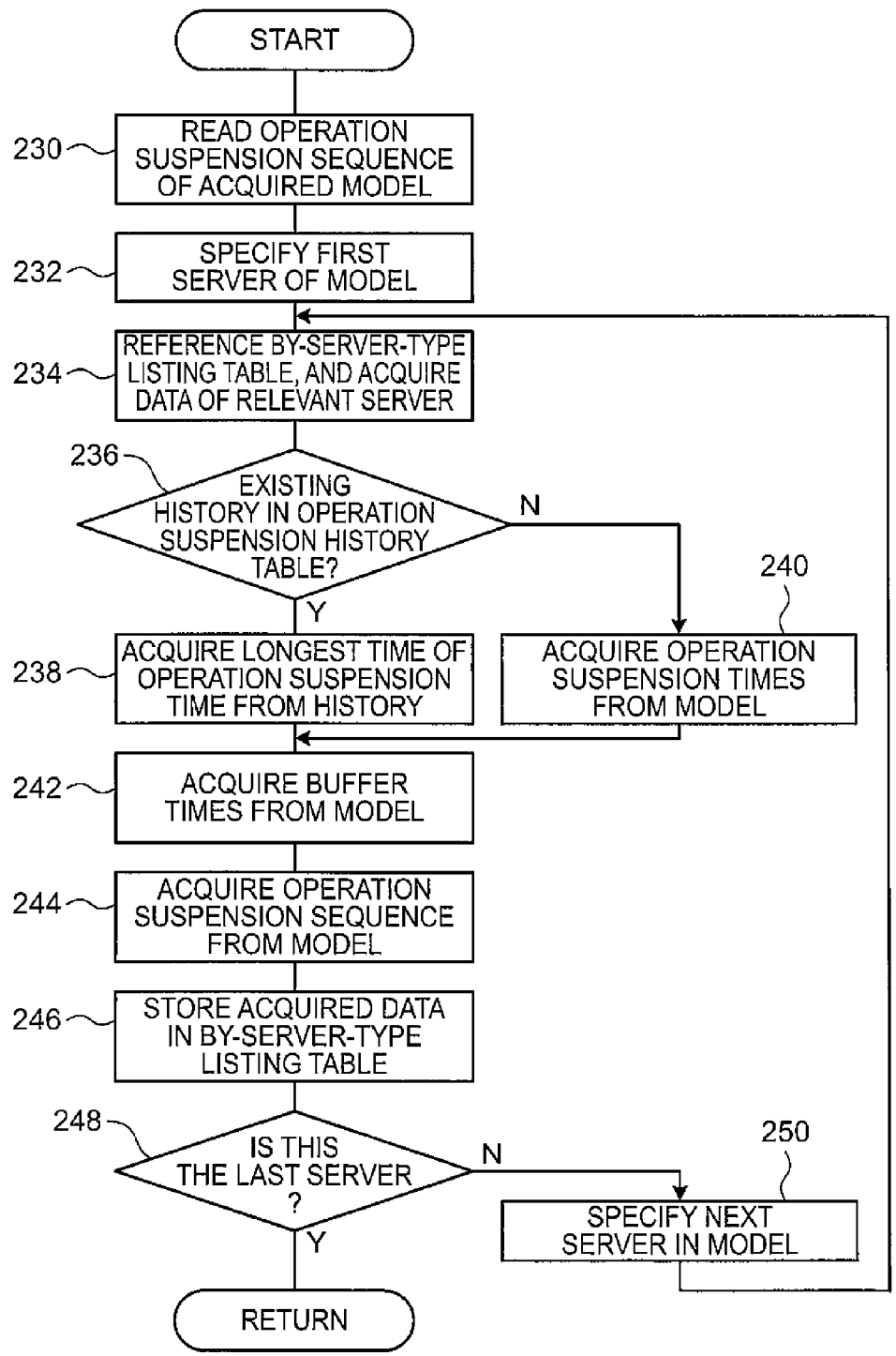
FIG. 8 is a flow chart illustrating a flow of operation suspension sequence determination processing.

FIG. 8 is a flow chart illustrating a flow of operation suspension sequence determination processing according to the present exemplary embodiment. When operation suspension sequence determination processing is executed, the by-server-type listing table 26 is referenced at step 230, and the operation suspension sequence of the model acquired at step 224 or step 226 (see FIG. 7) is read. In this case, data indicating the sequence of the web server (WEB_SERVER) of the virtual machine 56, the application server (AP_SERVER) of the virtual machine 48, and the database server (DB_SERVER) of the virtual machine 38, is read as the operation suspension sequence.

Then at step 232, the first server of the sequence in the acquired model is specified. In this case the web server (WEB_SERVER) of the virtual machine 56 is specified.

Then at step 234, the by-server-type listing table 26 (FIG. 4) is referenced, and data relating to the specified server acquired. For example, when the web server (WEB_SERVER) is specified, this corresponds to the item "uuid-1" of the "uuid" in FIG. 4. Then at step 236, the operation suspension history table 28 (FIG. 5) is referenced, and determination is made as to whether or not the specified server is present in the operation suspension history table 28. For example, when web server (WEB_SERVER) is specified, in FIG. 5 there is no historical data in the column of operation suspension time corresponding to the item "uuid-1" of "uuid".

If affirmative determination is made at step 236, processing proceeds to step 238, and the longest period of time is acquired from out of the historical data. In the present exemplary embodiment, explanation is of a case in which the longest period of time is acquired from out of the historical data; however, technology disclosed herein is not limited thereto. For example, the longest period of time may be increased or decreased by a specific period of time. The average period of time of the historical data may also be derived, and the average period of time employed. A period of time that appears with a frequency of a specific value or greater in the historical data may also be employed.

However, if negative determination is made at step 236, the model table 24 is referenced at step 240, and the recorded operation suspension time is acquired as the initial value. In this case the web server (WEB_SERVER) is specified, and so "300 seconds" is acquired from the model table 24 as the operation suspension time.

At the next step 242, the model table 24 is referenced, and the buffer time of the relevant server acquired. In this case the web server (WEB_SERVER) is specified and so "30 seconds" is acquired as the buffer time in the model table 24. At the next step 244, the model table 24 is referenced, and the data indicating the operation suspension sequence of the relevant server is acquired. In this case the sequence position "1" is acquired as the operation suspension sequence of the web server (WEB_SERVER). Data representing the acquired operation suspension time, buffer time, and operation suspension sequence is then stored (recorded) at the next step 246 in the by-server-type listing table 26.

Then, at step 248, determination is made as to whether or not the server for current processing is the final server of the corresponding model, and the present routine is ended if it is the final server (affirmative determination at step 248). However, if there is a remaining server in the model (negative determination at step 248), then the next server of the model is specified at step 250, and processing returns to step 234, and execution of the processing described above is repeated.

The waiting time for power recovery calculation section 18 (FIG. 1) then, at step 208 in FIG. 6, executes the waiting time for power recovery calculation processing. Namely, in the waiting time for power recovery calculation, the time to start the operation suspension of each of the virtualized servers and virtual machines of the identified model is calculated within the time available for power supply from the uninterruptible power supply device 32. The waiting time for power recovery calculation processing is executed by the processing routine of the waiting time for power recovery calculation process 74 (see FIG. 9).

Figure 9:
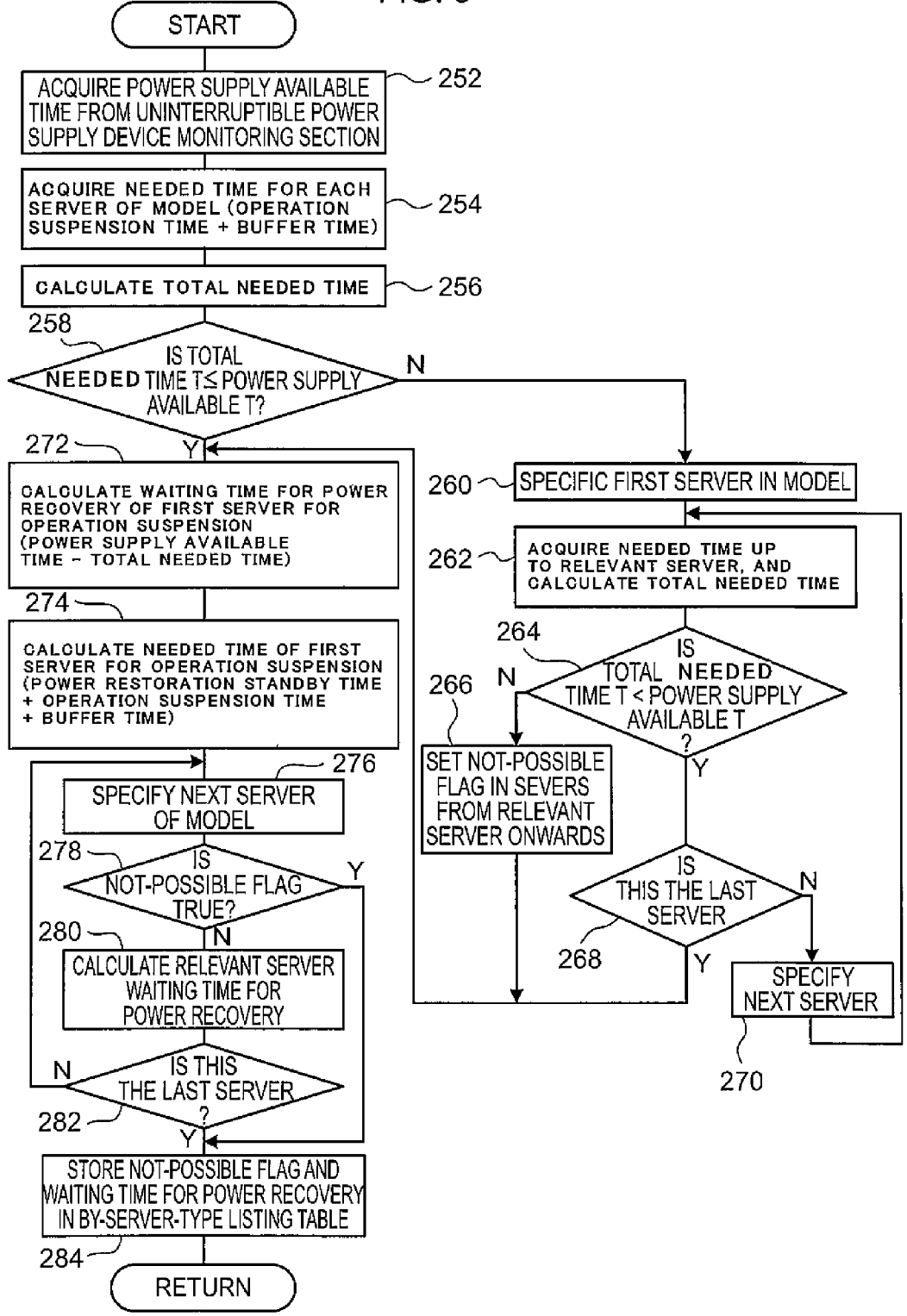
FIG. 9 is a flow chart illustrating a flow of waiting time for power recovery calculation processing.

FIG. 9 is a flow chart indicating a flow of waiting time for power recovery calculation processing according to the present exemplary embodiment. When the waiting time for power recovery calculation has been executed, then the power supply available time of the uninterruptible power supply device 32 is acquired at step 252. Namely, at step 252, the power supply available time of the uninterruptible power supply device 32 is acquired using the state monitoring program 78 already being executed. Then, at step 254, the times needed for operation suspension (operation suspension time+buffer time) of each of the servers of the model acquired at step 204 (see FIG. 6) are acquired, and at the next step 256, the total time of the acquired time is calculated as the total needed time.

At the next step 258, determination is made as to whether or not the power supply available time acquired at step 252 is the total needed time calculated at step next step 256 or greater. Processing proceeds to step 272 if the power supply available time is the total needed time or greater (affirmative determination at step 258), and the waiting time for power recovery of the server whose operation is to be suspended first is calculated. The waiting time for power recovery may be derived by subtracting the total needed time from the power supply available time. At the next step 274, the needed time of the server that is to be suspended first is calculated. The needed time may be calculated by summing the recovery standby time, the operation suspension time, and the buffer time.

Then at step 276, the next server in the model acquired at step 204 (FIG. 6) is specified, and at the next step 278 determination is made as to whether or not the not-possible flag of the relevant server is True. If the not-possible flag of the relevant server is False (negative determination at step 278), then the waiting time for power recovery and the needed time of the relevant server are calculated at step 280, and processing proceeds to step 282. At step 282, determination is made as to whether or not the relevant server is the final server in the model acquired at step 204 (step 6), and processing proceeds to step 284 if affirmative determination is made, and processing returns to step 276 if negative determination is made, and the processing described above is repeated.

However, if affirmative determination is made at step 278, since it is difficult to perform operation suspension of the servers following the relevant server within the power supply available time, calculation of step 280 is not needed, and processing proceeds to step 284. At step 284, the not-possible flag and the waiting time for power recovery of each of the servers is recorded in the by-server-type listing table 26, and the present routine is ended.

If the total needed time calculated at step next step 256 is less than the power supply available time, then negative determination is made at step 258, and processing proceeds to step 260. At step 260, the first server of the model acquired at step 204 (FIG. 6) is specified, and at the next step 262, the needed time up to the relevant server is acquired, and the total needed time calculated. At the next step 264, determination is made as to whether or not the total needed time calculated at step 262 is less than the power supply available time calculated at step 256. If the power supply available time is the total needed time or less (negative determination at step 264), processing proceeds to step 266, and the not-possible flag is set as True for the servers following on from the relevant server in the operation suspension sequence, and processing proceeds to step 272. However, if the total needed time exceeds the power supply available time (affirmative determination at step 264), processing proceeds to step 268, and determination is made as to whether or not the relevant server is the last server in the model. Processing proceeds to step 272 if affirmative determination is made at step 268, and if negative determination is made, processing returns to step 262 after the next server in the operation suspension sequence is specified at step 270, and the processing described above is repeated.

As described above, processing proceeds to step 210 of FIG. 6 when the calculation processing of the waiting time for power recovery is finished by the waiting time for power recovery calculation section 18 (FIG. 1). At step 210, the by-server-type listing table 26 is referenced, and determination is made as to whether or not there is a server present in the by-server-type listing table 26 with a not-possible flag of False. If negative determination is made at step 210, then processing proceeds straight to step 214 since operation suspension is possible within the power supply time for all the servers having interdependency. However, if affirmative determination is made at step 210, then there is a server present in the system having interdependency that is difficult to perform operation suspension on within the power supply time. The needed time to transition a server to sleep mode is shorter, by a specific time, than the time needed for so-called shutdown. Thus in the present exemplary embodiment, processing to transition the server to sleep mode is executed as an example of a countermeasure to server operation suspension difficulties. Consequently, at step 212, the servers in the by-server-type listing table 26 whose not-possible flag is False are set to transition to sleep mode, and processing proceeds to step 214 and processing transitions to the processing of the operation suspension execution section 20 (FIG. 1).

The operation suspension execution section 20 (FIG. 1) then, at step processing proceeds to step 214 of FIG. 6, executes the operation suspension processing of the server according to the time calculated by the waiting time for power recovery calculation section 18, and the computer executes instruction to suspend operation (so-called shutdown). Namely, the operation suspension execution section 20 executes instruction of operation suspension (so-called shutdown) of the virtual machines 38, 40, 42, 48, 50, 56, the virtualized servers 36, 46, 54, and the computers 34, 44, 52. The operation suspension execution processing of the operation suspension execution section 20 executes the processing routine of the operation suspension execution process 76 (see FIG. 10), and performs operation suspension of the plural virtualized servers and virtual machines in operation having an interdependence relationship.

Figure 10:
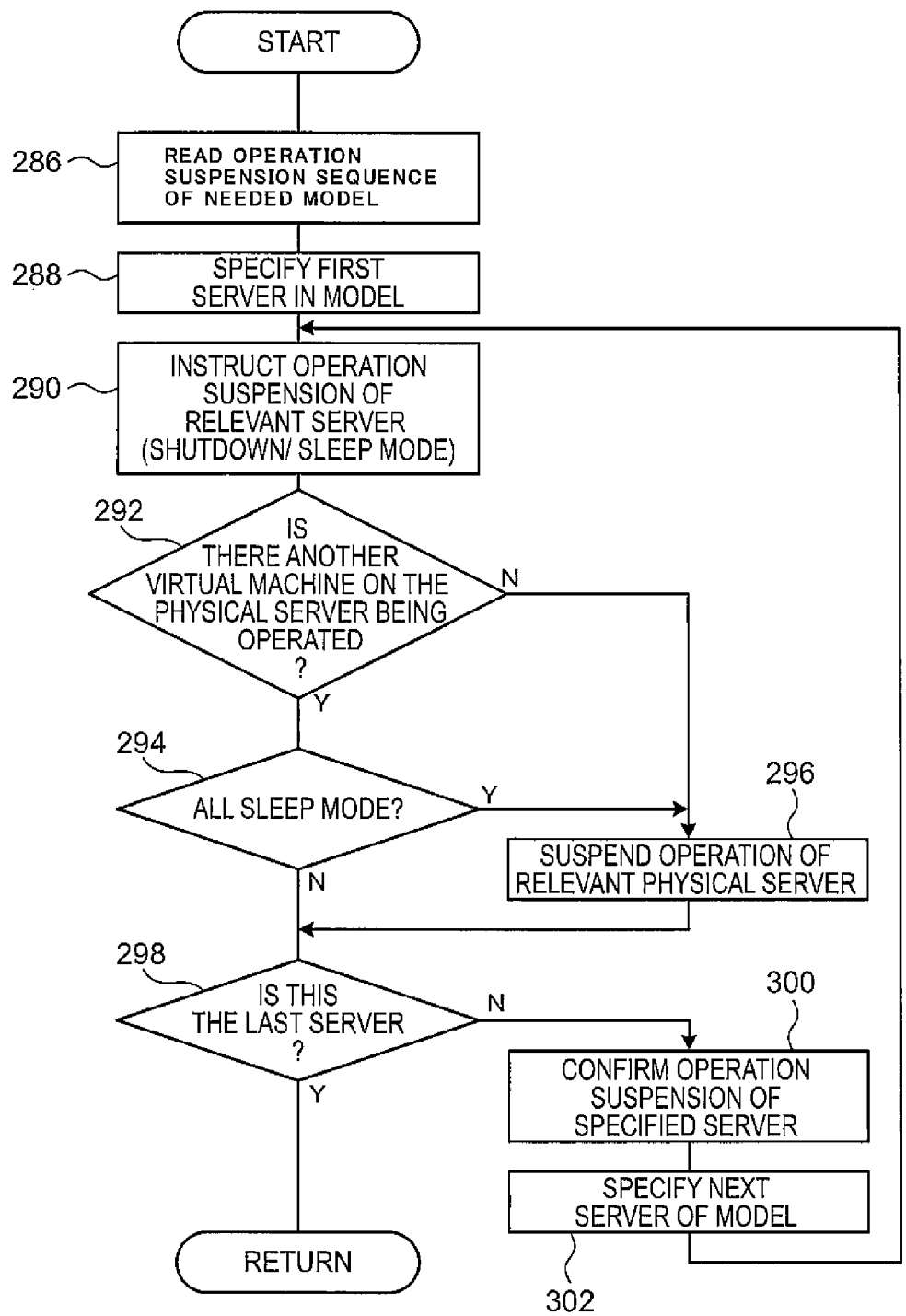
FIG. 10 is a flow chart illustrating a flow of operation suspension execution processing.

FIG. 10 is a flow chart illustrating a flow of operation suspension execution processing according to the present exemplary embodiment. When the operation suspension execution processing is executed, the operation suspension sequence of the model acquired at step 204 is read at step 286. In this case data indicating the sequence of the web server (WEB_SERVER) of the virtual machine 56, the application server (AP_SERVER) of the virtual machine 48, and the database server (DB_SERVER) of the virtual machine 38 is read.

At the next step 288, the server that is first in sequence in the acquired model is specified. In this case the web server (WEB_SERVER) of the virtual machine 56 is specified. Then, at step 290, instruction to stop operation of the relevant server is executed. Namely, at step 290, an instruction to output, to the relevant server, a shutdown command, or a transition command to sleep mode, is output to the control program 80 already being executed. Discrimination between a shutdown command, or a transition command to sleep mode, may be determined from the value of the operation suspension not-possible flag of the by-server-type listing table 26.

At the next step 292, determination is made as to whether or not there is another virtual machine present on the physical server on which the relevant server (virtual machine) is operating. Processing proceeds to step 294 if affirmative determination is made, and processing proceeds to step 296 if negative determination is made. Determination of step 292 may be determined from data stored in the state monitoring program 78 of whether or not there is a virtual machine corresponding to the physical server being monitored by the state monitoring program 78 already being executed. If affirmative determination is made at step 292, processing proceeds to step 294 and determination is made as to whether or not all of the other virtual machines in operation on the relevant physical server are to be transitioned to sleep mode. Processing proceeds to step 296 if affirmative determination is made, and processing proceeds to step 298 if negative determination is made.

At step 296, instruction to suspend operation of the relevant physical server is executed. Namely, at step 296, an instruction to output a shutdown command to the relevant physical server is output to the control program 80 already being executed.

At the next step 298, determination is made as to whether or not the server (virtual machine) specified at step 288 is the last server of the model acquired at step 204, and the present routine is ended there if affirmative determination is made. However, if negative determination is made at step 298, then processing proceeds to step 300, and operation suspension of the relevant server specific at step 288 is confirmed. After operation suspension of the relevant server has been confirmed, at step 302, the next server in the model acquired at step 204 is specified, and then processing returns to step 292, and the processing described above is repeated.

In the present exemplary embodiment, each of the waiting times for power recovery and operation suspension sequence numbers is set from the operation state of each of the virtualized servers and virtualized machines connected to the uninterruptible power supply device 32 and the interdependence relationship of each of the virtualized servers and virtualized machines.

Figure 11:
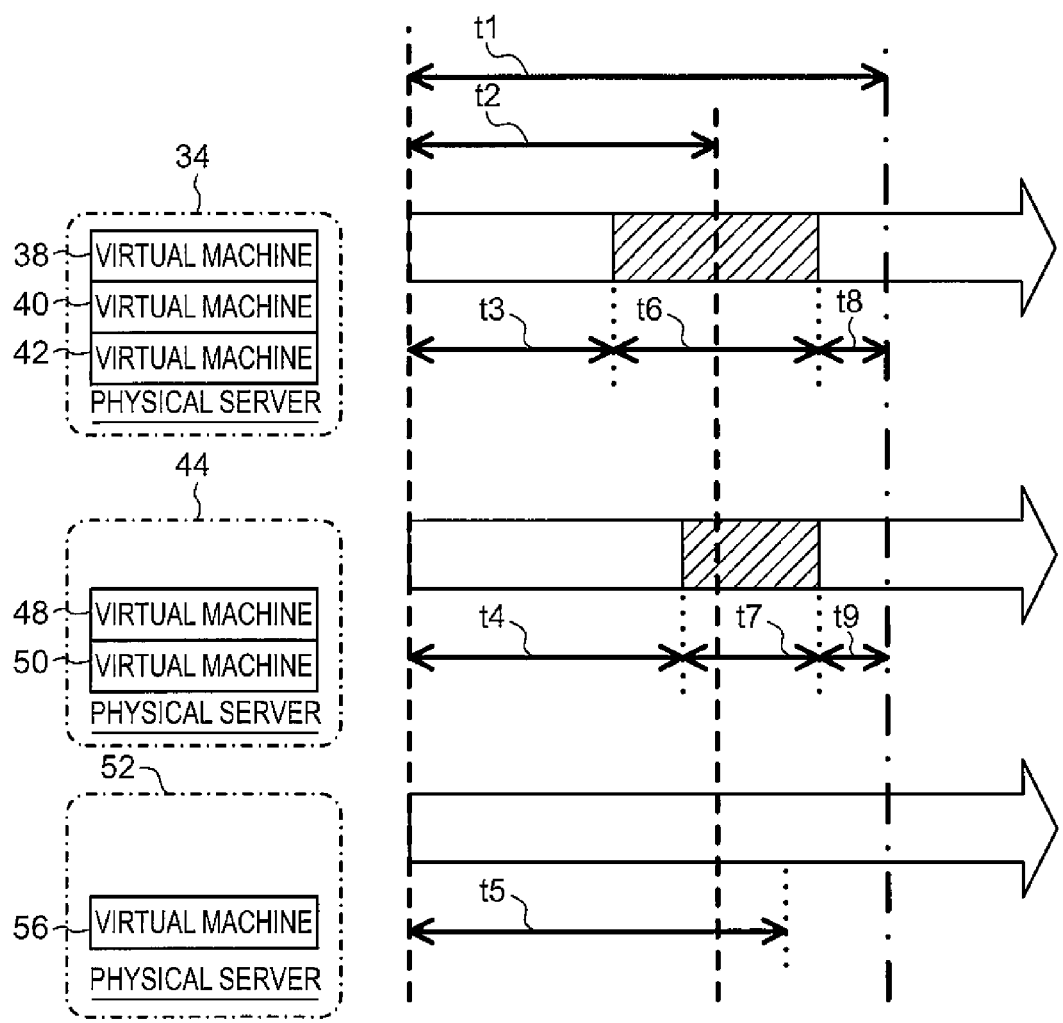
FIG. 11 is an explanatory diagram of waiting time for power recovery.

As illustrated in FIG. 11, in the computer system 58, the virtual machines 38, 40, 42 operate under management of the computer 34, the virtual machines 48, 50 operate under management of the computer 44, and the virtual machine 56 operates under management of the computer 52. For example, the computer 34 on which the three virtual machines 38, 40, 42 operate has a larger CPU processing load than the computer 44 and the computer 52. The time needed for operation suspension of the computer 34 (operation suspension time) is accordingly a longer period of time than that of the computer 44 and the computer 52. In the present exemplary embodiment, the waiting time for power recovery, that is the time from detection, of a power outage or the like, to transition to the operation suspension processing, is dynamically derived from the interdependence relationship to the operation states of the virtualized servers and virtualized machines.

For example, if the power supply available time from the uninterruptible power supply device 32 (power supply available time) is a fixed time t1, then operation suspension needs to be performed before the time t1 has elapsed from a power outage. However, if the waiting time for power recovery is a fixed time t2, then there is a concern that damage to the computers 34, 44 might occur if power supply from the uninterruptible power supply device 32 is interrupted while operation suspension processing to the computers 34, 44 is still in progress. To address this, in the present exemplary embodiment, a period of time prior to the total time of a time t6 needed for operation suspension in the computer 34 and a buffer time t8, is set as the operation suspension start time. Namely, this is within a time t3 that is the total time of the time t6 and the time t8, subtracted from the power supply available time t1 of the uninterruptible power supply device 32. In the computer 44, this is within a time t4, the total time of the operation suspension time t7 and the buffer time t9, subtracted from the time t1 of the uninterruptible power supply device 32. In this manner, in the present exemplary embodiment, the degrees of freedom of the operation suspension start time is increased by adjusting the waiting time for power recovery compared to technology in which a fixed value is employed as the waiting time for power recovery, enabling damage to the computer accompanying operation suspension to be suppressed. In the time t2 within the power supply available time t1, normal operation may be resumed if the power outage is resolved.

Moreover, in the present exemplary embodiment, the operation suspension sequence is set from the operation state, such as of the virtualized machines, and the interdependence relationship, such as of the virtualized machines.

Figure 12:
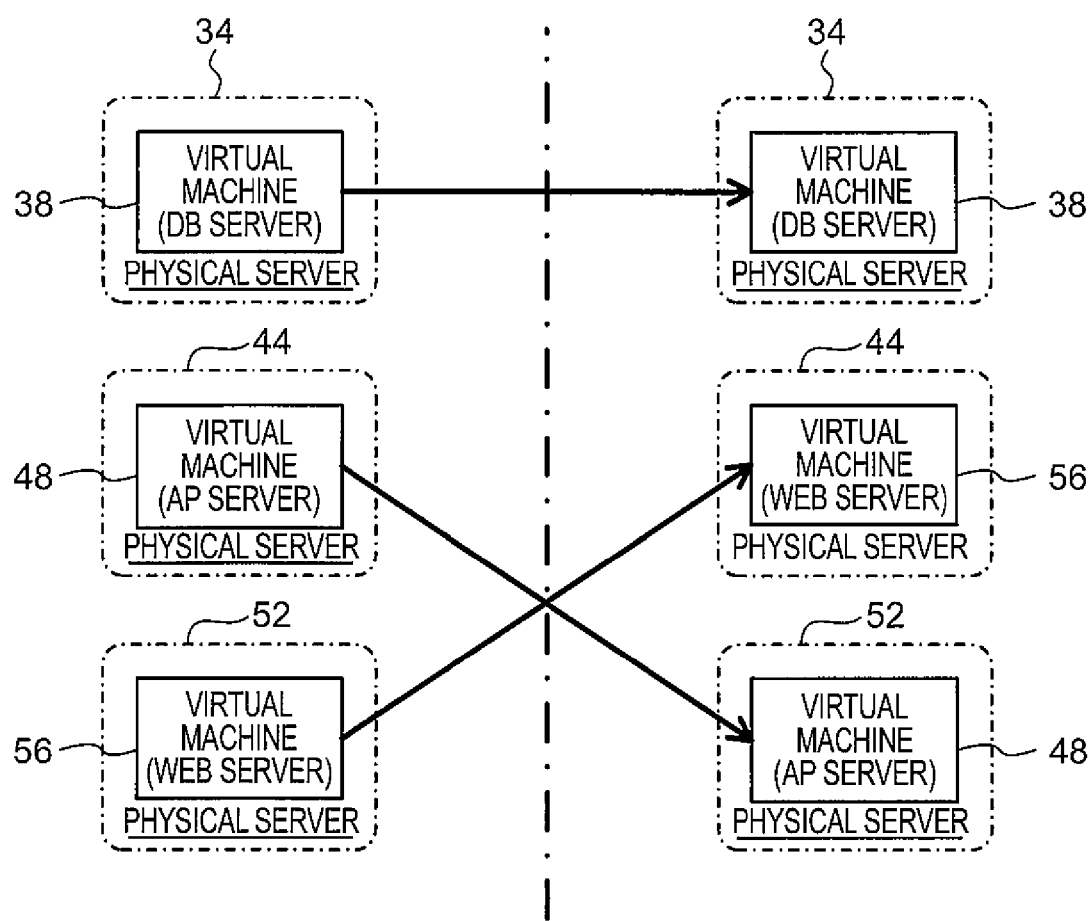
FIG. 12 is an explanatory diagram of migration of a virtual machine.

As illustrated in FIG. 12, in the computer system 58, the virtual machine 38 is included as a database server on the computer 34. The virtual machine 48 is also included as an application server on the computer 44. The 3 layer system including virtual machine 56 as a web server is initially configured in the computer 52. In such cases, the operation suspension sequence of the initial configuration of the 3 layer system is computers 34, 44, 52, and generally setting is made such that execution of operation suspension processing is by, for example, batch processing, such that operation is suspended for each of the computers according to this sequence. However, during operation of the computer system 58, sometimes a user (controller) in possession of a functionality making virtual machines migratable requests migration of a virtual machine. For example, depending on the migration conditions, such as system maintenance and CPU load, sometimes, for example, the application server virtual machine 48 is moved to the computer 52, and the web server virtual machine 56 is moved to the computer 44. There are also cases in which plural virtual machines are unevenly distributed on a single computer.

In cases in which virtual machines have been moved from their initial configuration positions, a difference arises between the operation suspension processing set in the initial configuration, resulting in operation suspension processing being executed in an incorrect sequence. In the present exemplary embodiment, the sequence for operation suspension is determined from the operation state such as of the virtualized machines, and the interdependence relationship such as of the virtualized machines, and operation such as of the virtualized machines, is suspended according to the determined operation suspension sequence. Consequently, operation of virtual machines can be suspended according to the changed position of the virtual machines, even when there has been a change from the initially configured operation suspension sequence. This thereby enables suspension of operation of computers to be performed according to the state of the migrated system in which virtualized servers and virtualized machines have been migrated.

As described above, in the present exemplary embodiment, the management device 60 controls and monitors the uninterruptible power supply device 32, and the virtualized servers and virtual machines contained on physical servers supplied with power from the uninterruptible power supply device 32. When the management device 60 detects a power outage or the like through the uninterruptible power supply device 32, the power restoration standby time, and sequence position of operation suspension (shutdown) is dynamically set from the operation state and the interdependence relationships of each of the virtualized servers and virtual machines connected to the uninterruptible power supply device 32.

The waiting time for power recovery is set as the time arising from subtracting the total time of the operation suspension time (for example the shutdown time) and buffer time, from the power supply available time of the uninterruptible power supply device 32. Namely, the total of the waiting time for power recovery, the operation suspension time, and the buffer time, is calculated so as to be within the power supply available time. The operation suspension time is the time normally needed for operation suspension of the virtual machine as recorded in history, and maximum times and average times derived from the history are employed. The buffer time is also set in each of the servers (the virtualized servers, and virtual machines). Initial values are set when there is no history.

The sequence to suspend operation is determined by monitoring the operation state of the systems, and matching to plural models (network architecture charts) recoded as interdependence relationships. The appropriate operation suspension sequence is defined in consideration of the interdependence relationships for each of the models in the model table 24. The interdependence relationship may be confirmed from pre-defined server types and identification data (UUID) of the virtual machines.

Sleep mode of the OS is also set if, as a result of considering the operation suspension sequence and the time needed for operation suspension, it is predicted that operation suspension will not be completed within the power supply available time. The contents of the virtual machines being operated are thereby written to a storage section, protecting processing being executed.

Note that in technology to perform operation suspension with a fixed waiting time for power recovery, depending on the power recover time, the problem arises of a mixture of computers whose operation is suspended and computers whose operation is not suspended. Such a problem is solved in the present exemplary embodiment by starting up all the computers (the physical servers, the virtualized servers, and the virtual machines) that are connected to the uninterruptible power supply device 32 at a time the management device 60 detects power recovery.

The present exemplary embodiment, operation suspension can be completed during power supply, as described above, enabling safe system management to be achieved even during a power outage or the like. The operation suspension times are dynamically computed from the state and interdependence relationships of the physical machines and virtual machines, and the waiting time for power recovery is set such that sufficient operation suspension time is secured, thereby enabling operation suspension to be completed during power supply in consideration of the interdependence relationships between the servers during an emergency, such as a power outage. This thereby enables damage arising from forced power supply interruption during operation suspension to be suppressed, and enables the occurrence of trouble to computer assets by forced power supply interruption, such as damage or malfunction, to be suppressed.

Explanation has been given above of servers functioning as virtual machines contained on a physical server; however, there is no limitation to servers functioning as virtual machines. There is applicability, for example, to a physical server with any computers contained on virtualized servers.

Explanation has been given above of an example of a system modeled as a 3 layer system. However, there is no limitation to a system modeled as a 3 layer system, and obviously various improvements and modifications may be implemented within a range not departing from the spirit as explained above.

Explanation has been given above of a program pre-stored (installed) in a storage section of a computer, however the program may be provided in a format recorded on recording medium, such as a CD-ROM or DVD-ROM.

One aspect is to enable occurrence of damage to computers accompanying operation suspension processing to be suppressed.

All cited documents, patent applications and technical standards mentioned in the present specification are incorporated by reference in the present specification to the same extent as if the individual cited documents, patent applications and technical standards were specifically and individually incorporated by reference in the present specification.

What is claimed is:

1. An operation management device comprising:
 a memory configured to store, for a plurality of nodes that each operate on one computer out of a plurality of computers included in a computer system and for the plurality of nodes capable of moving between the plurality of computers, operation suspension sequence data of the plurality of nodes, and data of operation suspension times needed for operation suspension of each of the plurality of nodes; and a processor configured to execute a procedure, the procedure comprising:

from a timing earlier than suspending operation of the computer system and a timing earlier than a total sum of the operation suspension times of the plurality of nodes or greater, suspending operation of the plurality of nodes in an operation suspension sequence indicated by the operation suspension sequence data, wherein a power supply available time, for supplying power from an uninterruptible power supply device to the plurality of nodes, if a power outage has occurred, is predetermined, and wherein, if the total sum of operation suspension times of the plurality of nodes exceeds the power supply available time, the suspending operation transitions nodes yet to complete operation suspension to a sleep mode at a timing when the power supply from the uninterruptible power supply device ends.

2. The operation management device of claim 1, wherein:

for each of the plurality of nodes, the memory stores, associated with each other, identification data to identify the node, interdependence relationship data representing the presence or absence of other nodes that are prerequisites to shut down operation when suspending operation of the node and including identification data of the other nodes when the other nodes are present, and the operation suspension time data, and the operation suspension sequence data is data representing the sequence to suspend operation of the plurality of nodes based on the interdependence relationship data, and the operation suspension time data is data representing the operation suspension time from start of operation suspension processing to shut down operation of the node to completing the operation suspension processing, the procedure further comprising calculating a total sum of operation suspension times of the plurality of nodes that operate in the computer system and that are indicated to have an interdependence relationship by the interdependence relationship data, wherein the suspending operation shuts down the operation of the plurality of nodes from a timing earlier than the total sum of the calculated operation suspension times or greater.

3. The operation management device of claim 1, wherein the procedure further comprises:

determining a sequence of the plurality of nodes based on the operation suspension sequence data, wherein the suspending operation suspends operation of the plurality of nodes in the operation suspension sequence indicated by the determined sequence of each of the plurality of nodes.

4. The operation management device of claim 1, wherein:

the memory stores historical data of operation suspension times of each of the nodes; and the suspending operation suspends operation of each of the plurality of nodes from a timing earlier than a total sum of the operation suspension time of the plurality of nodes based on the historical data or greater.

5. The operation management device of claim 1, wherein:

if the total sum of the operation suspension times of the plurality of nodes exceeds the power supply available time, the suspending operation derives nodes for which operation suspension is not complete at a timing when power supply from the uninterruptible power supply device ends, and transitions the derived operation suspension incomplete nodes to a sleep mode.

6. The operation management device of claim 1, wherein:

as a model of a dependent system of the plurality of nodes operating with an interdependence relationship, a model table is stored in the memory including data representing the models, and data to identify each of the plurality of nodes operating with the interdependence relationship, the procedure further comprising:

referencing the model table, matching the plurality of nodes being operated against the nodes included in the dependent system, and deriving the plurality of nodes being operated that are included in the dependent system, wherein the suspending operation executes suspension of operation of the plurality of nodes from a timing earlier than the total sum of the operation suspension times of each of the nodes included in the dependent system or greater.

7. The operation management device of claim 1, wherein the nodes include a virtual computer that operates on a given computer out of the plurality of computers.

8. An operation management method comprising executing processing including:

for a plurality of nodes that each operate on one computer out of a plurality of computers included in a computer system and for the plurality of nodes capable of moving between the plurality of computers, by a processor, referencing operation suspension sequence data of the plurality of nodes stored in a memory, and data of operation suspension times needed for operation suspension of each of the plurality of nodes stored in the memory, and from a timing earlier than suspending operation of the computer system and a timing earlier than a total sum of the operation suspension times of the plurality of nodes or greater, shutting down operation of the plurality of nodes in an operation suspension sequence indicated by the operation suspension sequence data, wherein a power supply available time, for supplying power from an uninterruptible power supply device to the plurality of nodes, if a power outage has occurred, is predetermined, and wherein, if the total sum of operation suspension times of the plurality of nodes exceeds the power supply available time, the suspending operation transitions nodes yet to complete operation suspension to a sleep mode at a timing when the power supply from the uninterruptible power supply device ends.

9. The operation management method of claim 8, wherein:

for each of the plurality of nodes, the memory stores, associated with each other, identification data to identify the node, interdependence relationship data representing the presence or absence of other nodes that are prerequisites to shut down operation when suspending operation of the node and including identification data of the other nodes when the other nodes are present, and the operation suspension time data, and the operation suspension sequence data is data representing the sequence to suspend operation of the plurality of nodes based on the interdependence relationship data, and the operation suspension time data is data representing the operation suspension time from start of operation suspension processing to shut down operation of the node to completing the operation suspension processing, the method further comprising:

by the processor, calculating a total sum of operation suspension times of the plurality of nodes indicated to have an interdependence relationship by the interdependence relationship data, wherein when suspending operation of the plurality of nodes, the operation of the plurality of nodes is shut down from a timing earlier than the total sum of the calculated operation suspension times or greater.

10. The operation management method of claim 8, wherein:

when suspending operation of the plurality of nodes, a sequence of the plurality of nodes is determined based on the operation suspension sequence data; and operation of the plurality of nodes is shut down in the operation suspension sequence indicated by the determined sequence of each of the plurality of nodes.

11. The operation management method of claim 8, wherein:

the memory includes historical data of operation suspension times of each of the nodes; and when suspending operation of the plurality of nodes, operation of each of the plurality of nodes is shut down from a timing earlier than a total sum of the operation suspension times of the plurality of nodes based on the historical data or greater.

12. The operation management method of claim 8, wherein:

when suspending operation of the plurality of nodes, if the total sum of operation suspension times of the plurality of nodes exceeds the power supply available time, the nodes yet to complete operation suspension are transitioned to a sleep mode at a timing when power supply from the uninterruptible power supply device ends.

13. The operation management method of claim 8, wherein:

when suspending operation of the plurality of nodes, if the total sum of the operation suspension times of the plurality of nodes exceeds the power supply available time, nodes are derived for which operation suspension is not complete at a timing when power supply from the uninterruptible power supply device ends, and the derived operation suspension incomplete nodes are transitioned to a sleep mode.

14. The operation management method of claim 8, wherein:

as a model of a dependent system of the plurality of nodes operating with an interdependence relationship, a model table is stored in the memory including data representing the models, and data to identify each of the plurality of nodes operating with the interdependence relationship, when suspending operation of the plurality of nodes, the model table is referenced, and the plurality of nodes being operated are matched against the nodes included in the dependent system, and the plurality of nodes being operated that are included in the dependent system are derived; and suspension of operation of the plurality of nodes is executed from a timing earlier than the total sum of the operation suspension times of each of the plurality of nodes included in the derived dependent system or greater.

15. The operation management method of claim 8, wherein the nodes include a virtual computer that operates on a given computer out of the plurality of computers.

16. A non-transitory computer-readable recording medium having stored therein a program for causing a computer to execute an operation management process, the process comprising:

for a plurality of nodes that each operate on one computer out of a plurality of computers included in a computer system and for the plurality of nodes capable of moving between the plurality of computers, referencing operation suspension sequence data of the plurality of nodes stored in a memory, and data of operation suspension times needed for operation suspension of each of the plurality of nodes stored in the memory, and from a timing earlier than suspending operation of the computer system and a timing earlier than a total sum of the operation suspension times of the plurality of nodes or greater, shutting down operation of the plurality of nodes in an operation suspension sequence indicated by the operation suspension sequence data, wherein a power supply available time, for supplying power from an uninterruptible power supply device to the plurality of nodes, if a power outage has occurred, is predetermined, and wherein, if the total sum of operation suspension times of the plurality of nodes exceeds the power supply available time, the suspending operation transitions nodes yet to complete operation suspension to a sleep mode at a timing when the power supply from the uninterruptible power supply device ends.

17. The non-transitory computer-readable recording medium of claim 16, wherein:

for each of the plurality of nodes, the memory stores, associated with each other, identification data to identify the node, interdependence relationship data representing the presence or absence of other nodes that are prerequisites to shut down operation when suspending operation of the node and including identification data of the other nodes when the other nodes are present, and the operation suspension time data, and the operation suspension sequence data is data representing the sequence to suspend operation of the plurality of nodes based on the interdependence relationship data, and the operation suspension time data is data representing the operation suspension time from start of operation suspension processing to shut down operation of the node to completing the operation suspension processing, the operation management process further comprising:

calculating a total sum of operation suspension times of the plurality of nodes indicated to have an interdependence relationship by the interdependence relationship data, wherein when suspending operation of the plurality of nodes, the operation of the plurality of nodes is shut down from a timing earlier than the total sum of the calculated operation suspension times or greater.

18. The non-transitory computer-readable recording medium of claim 16, wherein as a model of a dependent system of the plurality of nodes operating with an interdependence relationship, a model table is stored in the memory including data representing the models, and data to identify each of the plurality of nodes operating with the interdependence relationship;

when suspending operation of the plurality of nodes, the model table is referenced, and the plurality of nodes being operated are matched against the nodes included in the dependent system, and the plurality of nodes being operated that are included in the dependent system are derived; and suspension of operation of the plurality of nodes is executed from a timing earlier than the total sum of the operation suspension times of each of the plurality of nodes included in the derived dependent system or greater.

19. The non-transitory computer-readable recording medium of claim 16, wherein:

the nodes include a virtual computer that operates on a given computer out of the plurality of computers.

* * * * *